United States Patent [19]

Onoda et al.

[11] Patent Number: 5,472,653
[45] Date of Patent: Dec. 5, 1995

US005472653A

[54] METHOD FOR PRODUCING CARBON FIBER-REINFORCED PLASTIC MOLDING

[75] Inventors: Hiroshi Onoda; Kenichi Aoyagi, both of Yokohama, Japan

[73] Assignee: Nippon Oil Co., Ltd., Tokyo, Japan

[21] Appl. No.: 169,597

[22] Filed: Dec. 17, 1993

[30] Foreign Application Priority Data

Dec. 25, 1992 [JP] Japan .................................. 4-357978

[51] Int. Cl.⁶ ................................................. B29C 70/46
[52] U.S. Cl. .......................... 264/152; 264/258; 264/313
[58] Field of Search .............................. 264/313, 152, 264/258; 156/264; 425/405.2

[56] References Cited

U.S. PATENT DOCUMENTS

| | | | |
|---|---|---|---|
| 4,271,116 | 6/1981 | Jones | 264/313 X |
| 4,822,272 | 4/1989 | Yanase et al. | 425/328 |
| 5,204,042 | 4/1993 | James et al. | 264/313 X |

FOREIGN PATENT DOCUMENTS

| | | | |
|---|---|---|---|
| 60-30324 | 2/1985 | Japan | 264/313 |
| 60-44313 | 3/1985 | Japan | 264/313 |
| 4-22410 | 4/1992 | Japan . | |

Primary Examiner—Leo B. Tentoni
Attorney, Agent, or Firm—Bucknam and Archer

[57] ABSTRACT

A method for producing a lightweight, highly rigid, highly strong and less thermally expansible, carbon fiber-reinforced plastic molding, which comprises using a rigid female mold and elastic male mold(s) in combination and applying an external pressure to at least the male mold(s).

15 Claims, 5 Drawing Sheets

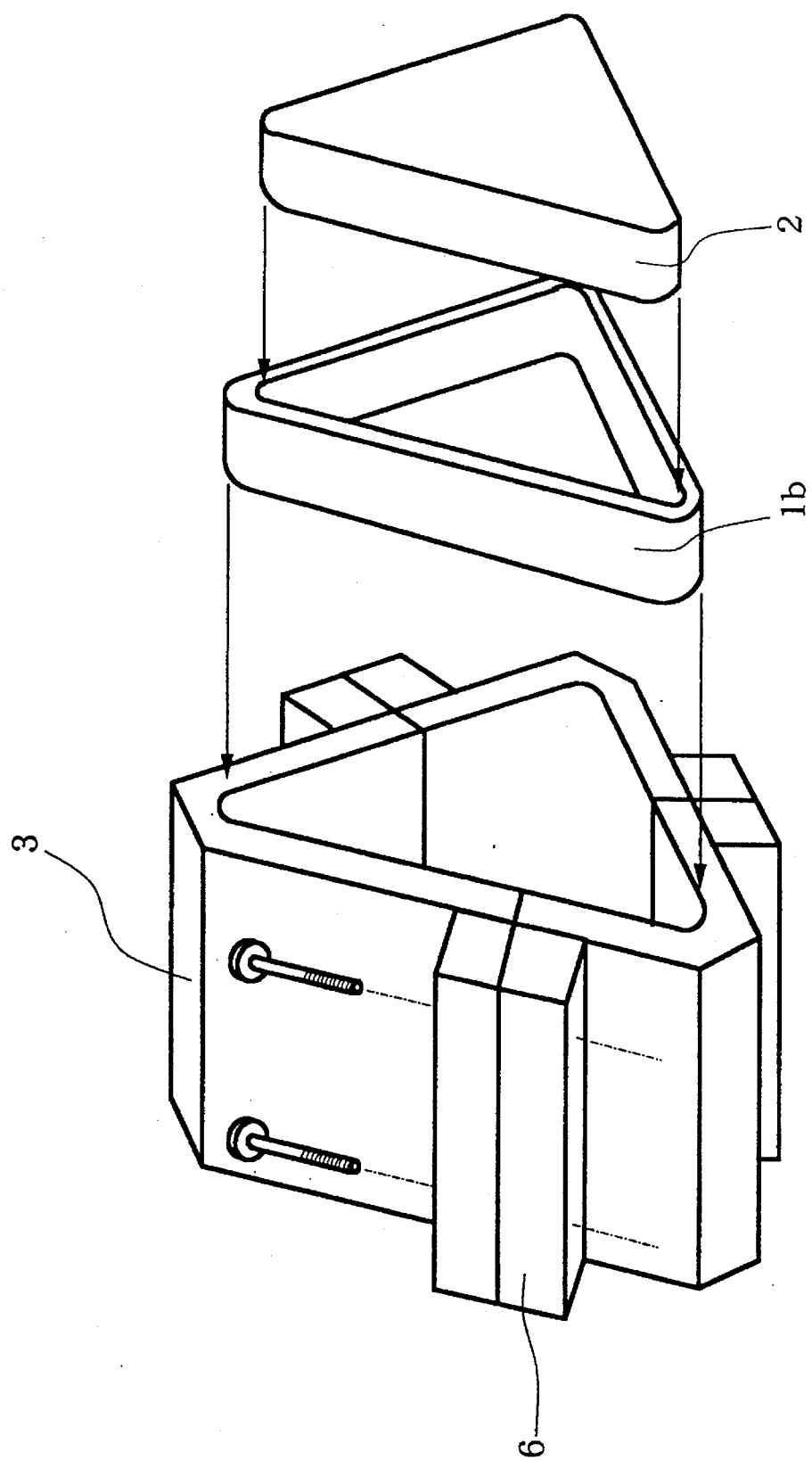

METHOD FOR PRODUCING CARBON FIBER-REINFORCED PLASTIC MOLDING

FIELD OF THE INVENTION

The present invention relates to a method for producing a carbon fiber-reenforced plastic molding and more particularly to a method for producing a carbon fiber-reinforced plastic molding to be used as a machine part, a structural part, a structural member of an optical instrument in particular, or the like, which is required to have light weight, high rigidity, high strength, high dimensional accuracy and dimensional stability under heat.

BACKGROUND OF THE INVENTION

Methods for producing a shaped article, which have heretofore been employed, include cutting of a metal from the viewpoint of processability and melt molding of a fiber-reinforced plastic (hereinafter referred to briefly as an "FRP") in a case where the shape of an article to be produced is complicated.

However, a shaped article made of a general-purpose metal is very heavy though it is high in rigidity and strength. The thermal expansion coefficient of such a shaped article, though low as compared with that of a resin molding, is unsatisfactory for use of the article as a part or a member in the field of optical instruments, etc., wherein very high dimensional accuracy is required. On the other hand, the use of a metallic material having a low thermal expansion coefficient involves a problem of high cost which is not economical.

Meanwhile, a shaped article (molding) of a fiber-reinforced plastic is comparatively easily obtained according to melt molding, examples of which molding are a molding of SMC (sheet molding compound), a molding of BMC (bulk molding compound), a molding obtained by stamping molding and a molding obtained by injection molding, in each of which moldings staple fibers are used.

However, such moldings (shaped articles) involve a problem of high thermal expansion coefficient because of difficulties in controlling the fiber volume content (Vf) and the fiber orientation.

In view of this, there have been proposed external pressure molding methods and internal pressure molding methods, wherein various molds are used.

The external pressure molding method, wherein a material to be molded is pressed against an inner mold of a metal or the like by means of an external atmospheric pressure or a shrinkable tape, involves such problems that no dimensional accuracy of external shape of the resulting molding can be secured, and that an additional working operation such as polishing is indispensable. For example, Japanese Patent Publication Gazette No. Hei 3-27375 (27,375/1991) discloses a method for producing a fiber-reinforced plastic molding, wherein continuous fibers are knitted together and wound around the surface of a metal, then impregnated with a matrix, and then molded by applying thereto an external pressure via a rubbery elastic body. According to this method, however, the female mold (outer mold) the rubbery elastic body serving as a female mold (outer mold) has such a degree of freedom as to make the external pressure uneven so that the molding material cannot uniformly be pressed against a male mold (inner mold). As a result, no dimensional accuracy of the external shape of the resulting molding can be secured, so that processing such as polishing or causing macroscopic nonuniformity and local variation in the sectional thickness of the resulting molding have been required. Further, since the rubbery elastic body serving as a female mold (outer mold) absorbs the pressure, it is hard to apply the external pressure to the resulting molding, thus leading to a high void content and hence many void defects in the resulting molding.

On the other hand, internal pressure molding (forming) is a method wherein a material to be molded is pressed against an outer mold of a metal or the like by means of an expansible core. Such internal pressure molding, though capable of producing a molding high in dimensional accuracy of its external shape, raises problems as to difficulties in producing a complicatedly shaped structure and loading a to-be-molded material Into an outer mold, and maybe unsuccessful or uneven application of a pressure to the corner, rib, etc., of a mold may occur, and failure in securing dimensional accuracy of sectional thickness of the resulting molding may result. For example, Japanese Patent Publication Gazette No. Hei 4-22410 (22410/1992) discloses a method of internal pressure molding using a flexible mandrel, which however raises such the above problems.

SUMMARY OF THE INVENTION

The present Invention has been made with a view to solving the foregoing problems of the prior art. Accordingly, an object of the present invention is to provide a method for producing a lightweight, highly rigid, highly strong, less thermally expansible and fiber-reinforced plastic molding having a complicatedly shaped structure provided with a corner, rib, etc.

According to one embodiment of the present invention, there is provided a method for producing a carbon fiber-reinforced plastic molding, which comprises using a female mold of a rigid material in combination with a male mold of an elastic material, and applying an external pressure to at least the male mold.

According to another embodiment of the present invention, there is provided a method for producing an integral, carbon fiber-reinforced plastic molding integrated with a rib-reinforced structure, which comprises using a female mold of a rigid material in combination with at least two male molds of elastic material, and applying an external pressure to at least the male molds.

The method of the present invention will now be described in detail while referring to the accompanying drawings.

FIG. 1 is a schematic model diagram illustrating the method of the present invention. In FIG. 1, numeral 1*a* refers to a prepreg laminate 1*b* to a molding, 2 to male molds, 3 to a female mold, 4 to a sealant, and 5 to a pressure vessel, while the arrows indicate directions of pressures (external pressure and internal pressure).

The prepreg laminate 1*a* is loaded between the male molds 2 and the female mold 3 and the gap between the male molds 2 and the female mold 3 is sealed with the sealant 4. The prepreg laminate 1*a* and the molds 2 and 3 are disposed in the pressure vessel 5.

The prepreg laminate 1*a* is obtained by cutting an FRP prepreg and laminating tile cut pieces of the FRP prepreg. The prepreg laminate 1*a* is loaded into the female mold 3.

The reinforcing fibers used in the FRP prepreg are not particularly restricted so long as they are usually usable reinforcing fibers. However, carbon fibers which are lightweight, high in rigidity and strength, capable of achieving dimensional accuracy and excellent in mechanical properties, linear expansion characteristics, etc., are especially preferably used. Such reinforcing fibers have a tensile modulus of elasticity of usually at least 20 tf/mm$^2$, preferably at least 40 tf/mm$^2$, more preferably at least 50 tf/mm$^2$, a tensile strength of preferably at least 300 kgf/mm$^2$, more preferably at least 320 kgf/mm$^2$, and a linear expansion coefficient of preferably at most $-0.5 \times 10^{-6}$/° C., more preferably at most $-1.0 \times 10^{-6}$/° C.

Filaments are preferably used as the reinforcing fibers as compared with staple fibers to realize a molding having comparatively isotropic mechanical properties (rigidity and strength) and high dimensional accuracy. The filaments used as the reinforcing fibers preferably include unidirectional fibers, crossed fibers, and a combination thereof. The orientation of the reinforcing fibers is controlled to enable lamination of prepregs without breakage of the fibers and integral molding of the resulting prepreg laminate without using joints.

The plastics to be used in the preparation of FRP prepregs is not particularly restricted so long as it can be used for ordinary FRPs as well. Examples of the plastics are epoxy resins, urethane resins, phenolic resins and isocyanate resins.

The male molds (inner molds) 2 used in the present invention are made of an elastic material, such as silicone rubber or a fluororubber, which material facilitates loading of a to-be-molded material into the outer mold and has high heat resistance and excellent chemical resistance.

The female mold (outer mold) 3 used in the present invention is made of a rigid material in order to secure dimensional accuracy of the external shape of a to-be-obtained molding. Such a rigid material includes general-purpose metals such as iron and stainless steel, and carbon fiber-reinforced plastics.

The prepreg laminate 1a is loaded on the surfaces of the male molds 2 and then loaded together with the male molds 2 into the female mold 3 made of the rigid material.

At this point, the thickness of the prepreg laminate 1a is so larger than that of the resulting desired molding that the laminate 1 is hard to load into the female mold 3. In the case where the female mold 3 is a combination-type or split-type female mold capable of being fastened or integrated with bolts or the like, however, the prepreg laminate 1a can be loaded into the female mold 3 because the male molds 2 are made of the elastic material. If desired, a release agent may be applied to the contact surfaces among the male and female molds 2 and 3 and the prepreg laminate 1.

In order to prevent outflow of the resin in the course of molding, sealing is necessary. In this case, it is desirable to use a sealant 4 having chemical resistance and heat resistance to a temperature necessary for curing the matrix resin. Such a sealant includes a commercially available butyl rubber or silicone rubber.

The male molds 2 and female mold 3 so loaded therebetween with the prepreg laminate 1a are placed in a pressure molding vessel 5, such as an autoclave, wherein the resin is cured under an external pressure.

In FIG. 1, an external pressure is applied to the male molds 2 and the female mold 3. Application of the external pressure aims not only at preventing the male molds 2 from escaping from the prepreg laminate 1a, but also at applying an internal pressure around the male molds 2 by making the most of the degree of freedom of the elastic material thereof. The effect of thermal expansion of the male molds 2 of the elastic material is not so large and about 1 to 2 kgf/cm$^2$ in terms of pressure. By contrast, the external pressure is 6 to 7 kgf/cm$^2$ and is transmitted as such in various directions to the prepreg laminate 1a via the elastic material of the male molds 2. This major role of the elastic material permits the production of a good molding having a low void volume content.

Fixation of the male molds 2 without application thereto of any external pressure cannot provide such an effect as the above. In this case, although the force of thermal expansion of the elastic material arises, the dimension of the prepreg laminate 1a between the male molds 2 is decreased, while the portion of the molding 1b between the male molds 2 and the female mold 3 is increased in void volume content because of insufficiency of a pressure applied thereto, thereby to fall to obtain a good molding.

The molding 1b, the male mold(s) 2 and the female mold 3 are illustrated in FIGS. 2 to 4. Like numerals denote like members in FIGS. 1 to 4, while numeral 6 refers to bolt-fastening jig portions. FIG. 5 illustrates a procedure of cutting a prepreg and laminating the cut pieces of the prepreg to form a prepreg laminate 1a.

According to the method of the present invention as described above, the advantages of (1) molding using an outer mold, (2) molding using inner mold(s) and (3) internal pressure molding, are made tile most of in combination so as to bring about the following effects:

(1) A molding can be easily detached from a split-type mold if used, is not required to be polished due to close contact of the visible portions of the molding with molds, and has a good dimensional accuracy of the external shape.

(2) Cut pieces of a prepreg, even if uneven, can be easily laminated while hardly forming gaps between the prepreg and molds.

(3) A prepreg laminate is so forcibly pressed against a female mold (outer mold) that a molding having an external shape exactly fitted in the female mold can be obtained while hardly forming interstices between the molds and the prepreg laminate and between the prepregs thereby let the molding free from voids.

BRIEF DESCRIPTION OF THE DRAWINGS

FIG. 3 is a perspective diagram illustrating another type of a male mold and a female mold to be used in the present invention and a molding obtained using them;

DESCRIPTION OF PREFERRED EMBODIMENTS

The present invention will be better understood by the Examples, Comparative Example and Experimental Example.

EXAMPLE 1

Torayca Prepreg P3051F-12 (trade name and commercially available product) having the following properties was used as the prepreg.

[Properties]

Carbon fiber: T300 (trade name)
tensile modulus of elasticity=23×10³ kgf/mm²
tensile strength=330 kgf/mm²
linear expansion coefficient=−0.7×10⁻⁶/° C.
areal weight of fiber=125 g/m²

Resin: epoxy resin composition
resin content=36 wt. %

Figure 1:
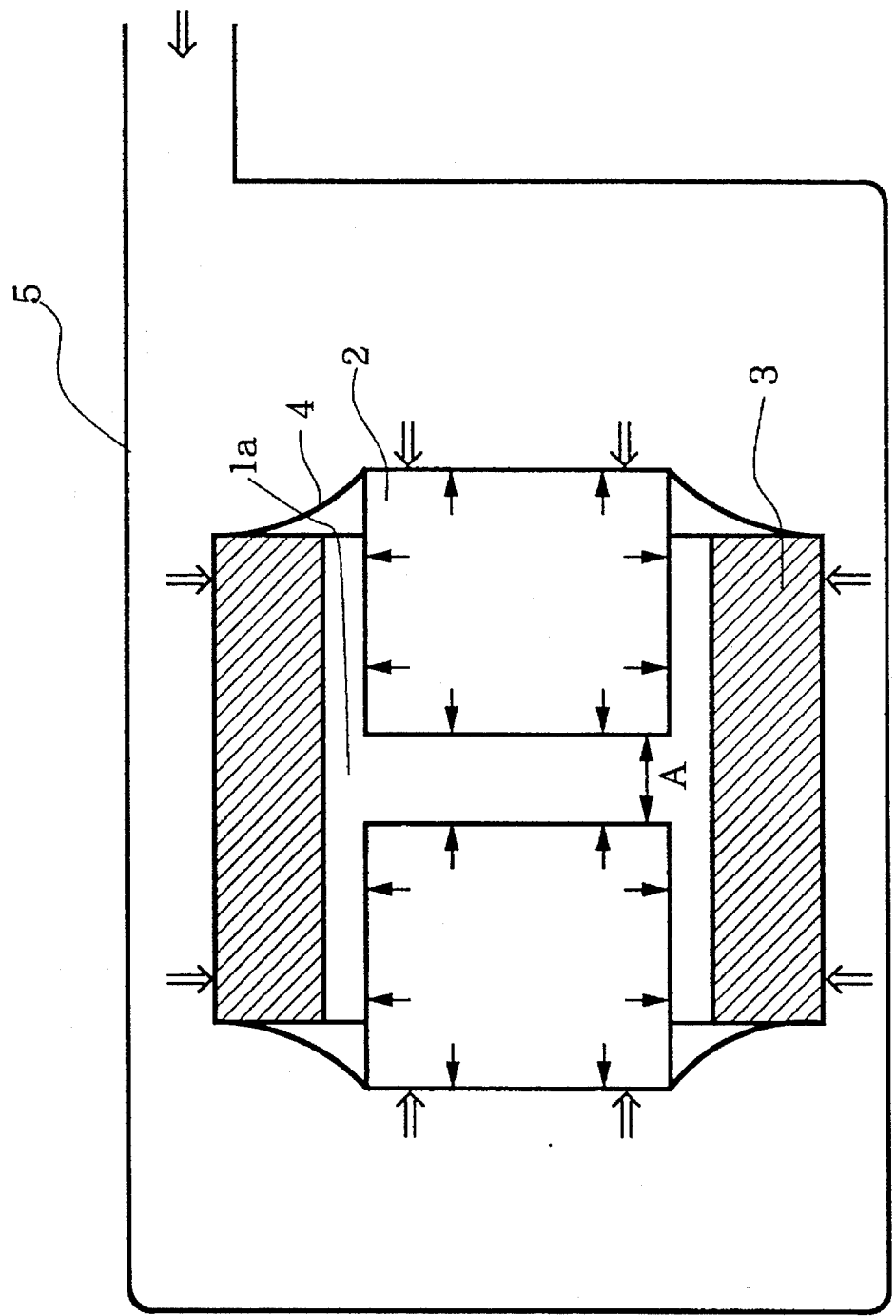
FIG. 1 is a schematic model diagram illustrating the method of the present invention.
Figure 2C:
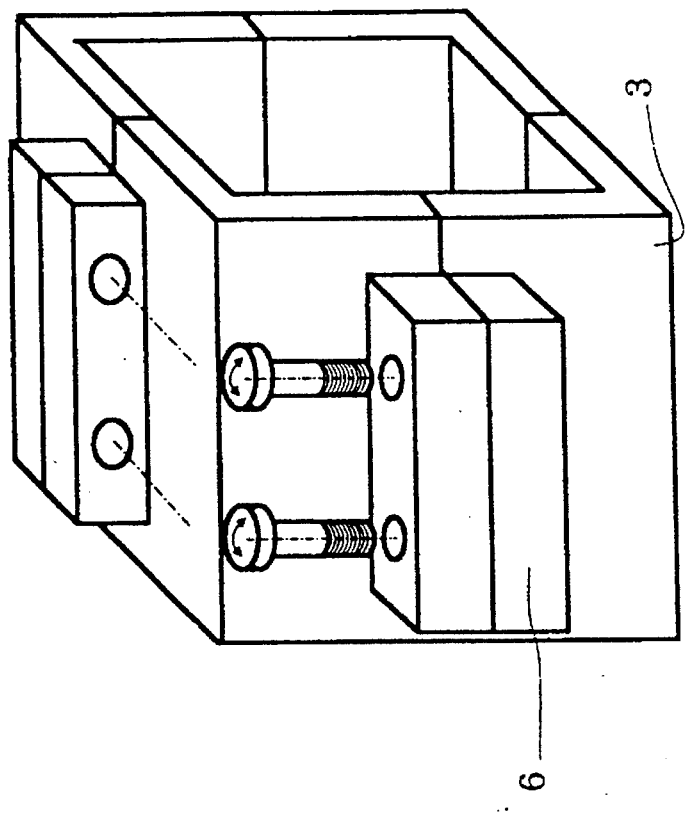
FIG. 2 is a perspective diagram illustrating male molds and a female mold to be used in the present invention and a molding obtained using them.
Figure 2A:
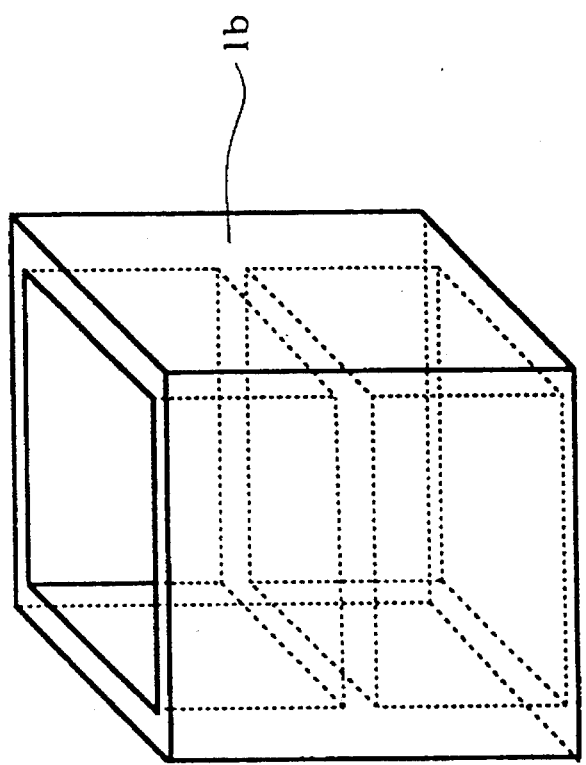
Figure 2B:
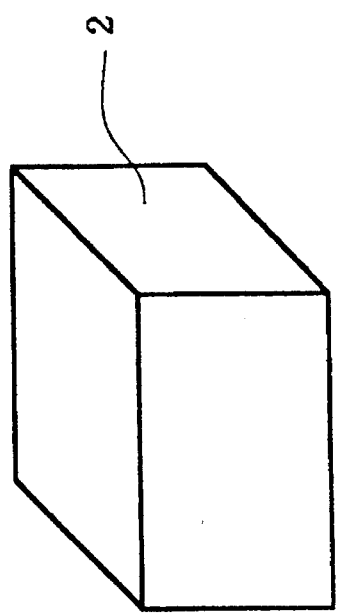
Figure 4:
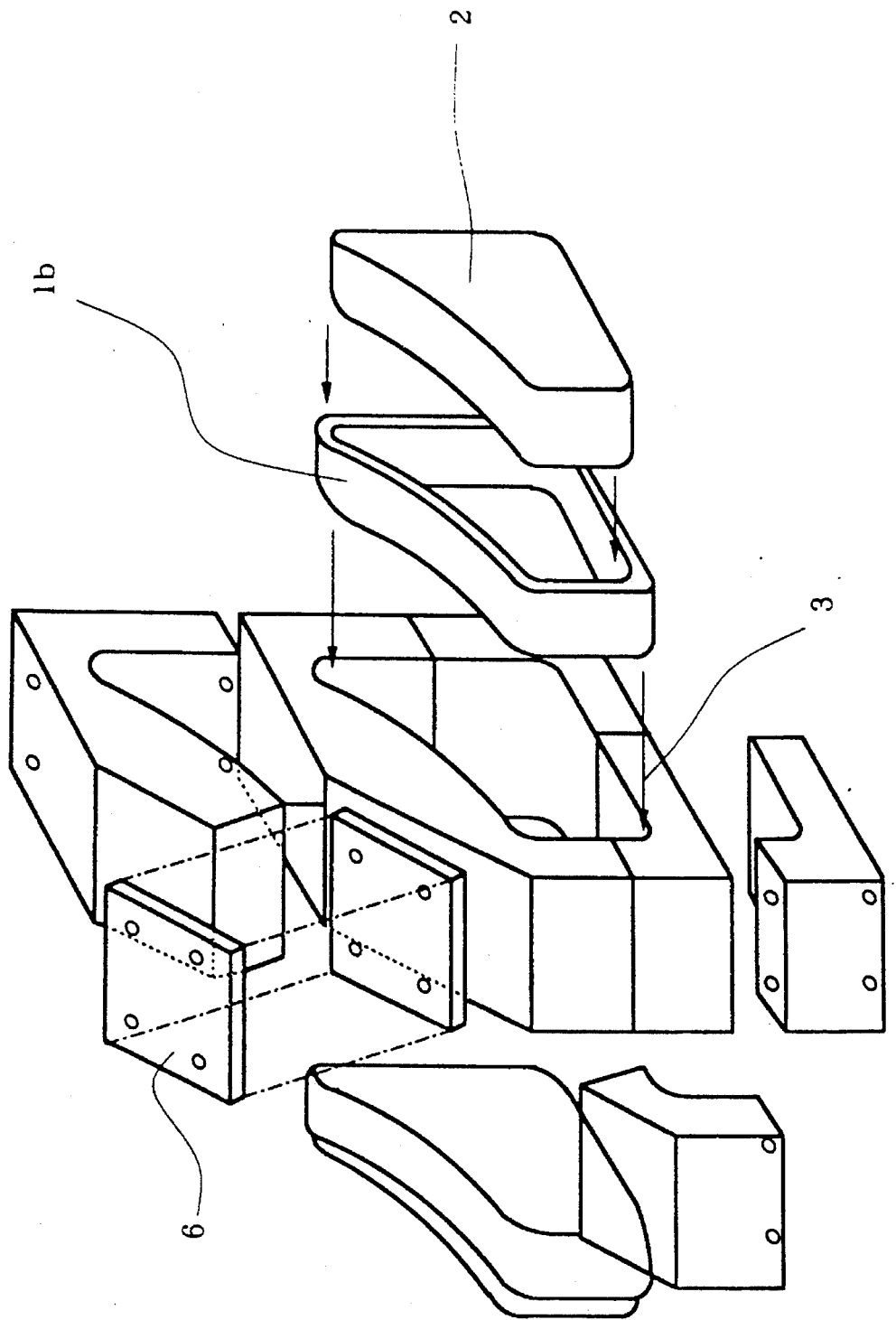
FIG. 4 is a perspective diagram illustrating a state of assembling tile members indicated in FIG. 3.

The prepreg having the above-mentioned properties was cut into pieces having a predetermined form, which were then laminated. The resulting prepreg laminate was molded using male molds of a silicon rubber (hardness: 90) as shown in FIG. 2 (*b*) and a female mold of SUS 310S as shown in FIG. 2 (*c*) to obtain a molding having a shape as shown in FIG. 2 (*a*).

The constitution of the prepreg laminate was [0°/90°/45°/−45°/−45°/45°/90°/0°]×2. The laminating procedure was as ilustrated in FIG. 5.

EXAMPLE 2

Torayca Prepreg P6343B-05 (trade name and commercially available product) having the following properties was used.

[Properties]

Carbon fiber: T300 (trade name)
tensile modulus of elasticity=23×10³ kgf/mm²
tensile strength=330 kgf/mm²
linear expansion coefficient=−0.7×10⁻⁶/° C. 10/10 (warps/wefts) plain weave
areal weight of fiber=125 g/m²

Resin: epoxy resin composition
resin content=40 wt. %

The prepreg having the above-mentioned properties was cut into pieces having a predetermined form, which were then laminated. The resulting prepreg laminate was molded using male molds of a silicone rubber (hardness:50) as shown in FIG. 2 (*b*) and a female mold of SUS 310S as shown in FIG. 2 (C) to obtain a molding having a shape as shown In FIG. 2 (*a*).

Figure 5:
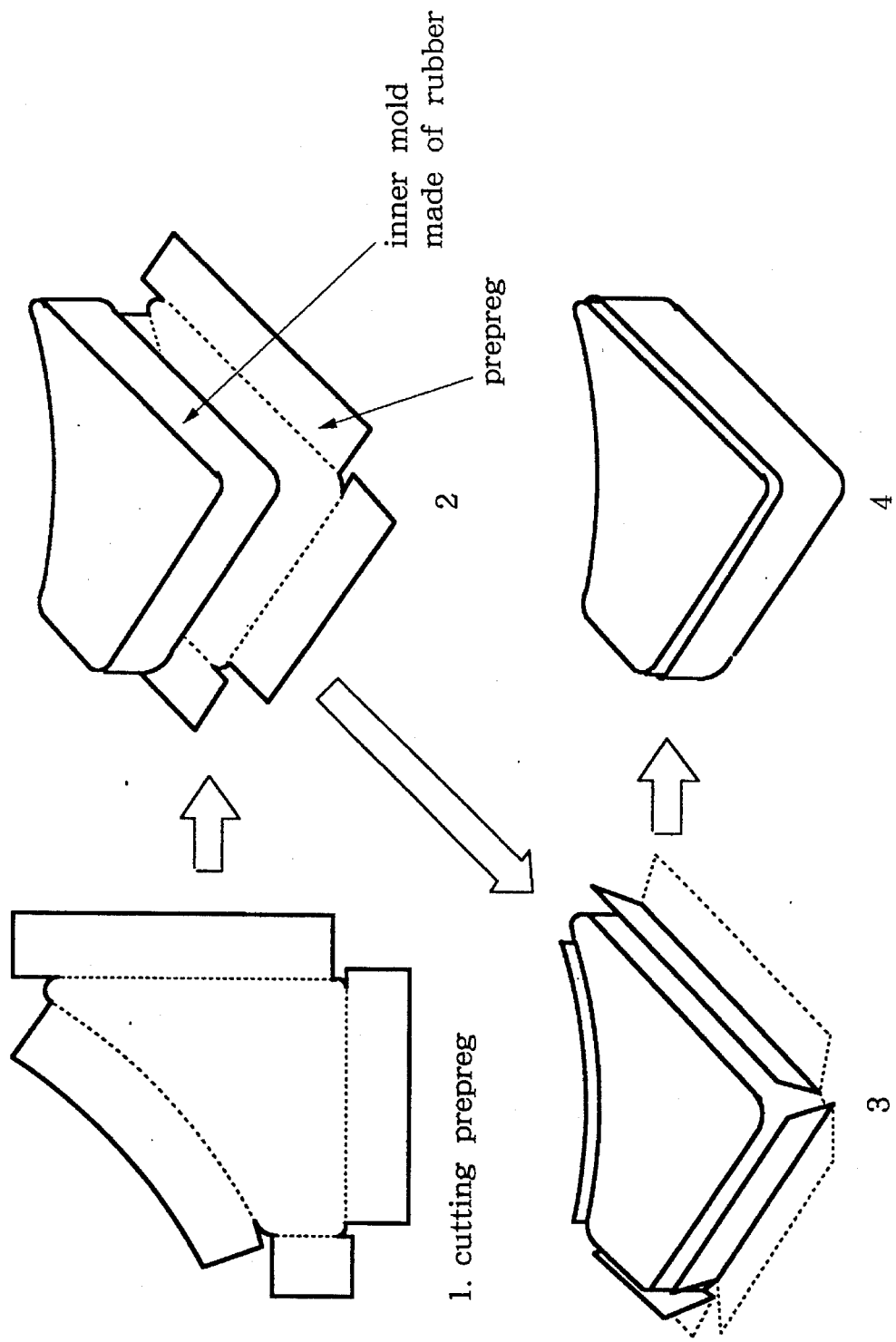
FIG. 5 is a process diagram illustrating a procedure of cutting a prepreg and laminating the cutted pieces of the prepreg.

The constitution of the prepreg laminate was [(0°/45°)×5]×2. The laminating procedure was as illustrated in FIG. 5.

EXAMPLE 3

A prepreg having the following properties was used.

[Properties]

Carbon fiber: Granoc XN-50 (trade name) manufactured by Nippon Oil Company. Ltd.
tensile modulus of elasticity=50×10³ kgf/mm²
tensile strength=360 kgf/mm²
linear expansion coefficient=−1.3×10⁻⁶/° C.
areal weight of fiber=150 g/m²

Resin: epoxy resin composition
resin content=27 wt. %

The prepreg having the above-mentioned properties was cut into pieces having a predetermined form, which were then laminated. The resulting prepreg laminate was molded using a male mold of a silicone rubber (hardness: 50) and a female mold of SUS 310S as shown in FIG. 3 to obtain a molding having a shape as shown in FIG. 3.

The constitution of the prepreg laminate was [0° C./90°/45°/−45°/−45°/45°/90°/0°]×2. The laminating procedure was as illustrated in FIG. 5.

EXAMPLE 4

A prepreg having the following properties was used.

[Properties]

Carbon fiber: Granoc XN-50 (trade name) manufactured by Nippon Oil Company, Ltd.
tensile modulus of elasticity=50×10³ kgf/mm²
tensile strength=360 kgf/mm²
linear expansion coefficient=−1.3×10⁻⁶/° C.
areal weight of fiber=125 g/m²

Resin: polyisocyanate resin composition
resin content=27 wt. %

The prepreg having the above-mentioned properties was cut into pieces having a predetermined form, which were then laminated. The resulting prepreg laminate was molded using a male mold of a fluororubber and a female mold of SUS 310S as shown in FIG. 3 to obtain a molding having a shape as shown in FIG. 3.

The constitution of the prepreg laminate was [0°/90°/45°/−45°/−45°/45°/90°/0°]×3. The laminating procedure was as illustrated In FIG. 5.

Comparative Example 1

Aluminum was used and cut into a shaped article having the same shape as those of the moldings of Examples 1 and 2.

Experimental Example

The moldings of Examples 1 and 2 and the shaped article of Comparative Example 1 were evaluated for their deformation under a load of 1 tf. The moldings of Examples 1 and 2 were deformed by 37 μm and 27 μm, respectively, while the shaped article of Comparative Example 1 was deformed by 23 μm. None of the moldings of Examples 1 and 2 and tile shaped article of Comparative Example 1 were broken under a load of 2 tf. The thermal expansion coefficients of the moldings of Examples 1 and 2 were 3.6×10⁻⁶/° C. and 3.8×10⁻⁶/° C., respectively, while tile thermal expansion coefficient of tile shaped article of Comparative Example 1 was 24×10⁻⁶/° C. The weights of the moldings of Examples 1 and 2 were 95 g and 94 g, respectively, while that of Comparative Example 1 was 166 g.

What is claimed is:

1. A method of producing a carbon fiber-reinforced plastic molding from a prepreg laminate which comprises the steps of a) inserting a carbon fiber-reinforced prepreg laminate in a cavity formed between a mold formed by a female mold and at least one male mold, said female mold being made of a rigid material and said male mold being made of an elastic material;

b) wherein a gap being formed after said prepreg laminate is inserted in said cavity is sealed with a sealant;

c) placing said mold in a pressure vessel whereby thermal expansion of said male mold causes pressure molding of said carbon fibers reinforced plastic molding and d) applying external pressure to said at least one male mold and said female mold, whereby internal pressure is also generated by the thermal expansion of said male mold.

2. The method according to claim 1, wherein said carbon fiber-reinforced plastic molding has a rib structure, and said mold comprises at least two elastic male molds.

3. The method according to claim 1, wherein said prepreg laminate is prepared by cutting a fiber reinforced plastic prepreg body whereby cut pieces of said fiber reinforced plastic prepreg are obtained, and laminating said cut pieces, said prepreg laminate being thereafter loaded to said female mold together with said at least one male mold.

4. The method according to claim 1, wherein said prepreg laminate has a thickness, said plastic molding finally obtained has a thickness and the thickness of said prepreg laminate at the time of loading is greater than the thickness of the finally obtained plastic molding.

5. The method according to claim 1, wherein the orientation of said reinforcing fibers contained in said prepreg is controlled to a prescribed direction.

6. The method according to claim 3, wherein the orientation of reinforcing fibers is controlled to a direction of 0°, ±45° or 90°.

7. The method according to claim 1, wherein the fibers contained in said prepreg form the carbon fiber reinforced plastic molding and are carbon fibers, the tensile modulus of elasticity thereof being at least 20 tf/mm$^2$ the tensile strength thereof being at least 300 kgf/mm$^2$, and the linear expansion coefficient thereof being at most $-0.5\times10^{-6}$/° C.

8. The method according to claim 7, wherein said carbon fibers have a matrix resin, and said matrix resin is a plastic resin selected from the group consisting of epoxy resin, urethane resin, phenolic resin and isocyanate resin.

9. The method according to claim 1, wherein said at least one male mold used is made of silicone rubber or fluororubber.

10. The method according to claim 1, wherein said female mold used is made of iron, stainless steel or carbon fiber-reinforced plastics.

11. The method according to claim 1, wherein said female mold used is of a combination-type or split-type, and is capable of being fastened with bolts.

12. The method according to claim 1, wherein said sealant is made of butyl rubber or silicone rubber.

13. The method according to claim 8, wherein said female mold, said male mold and said prepreg laminate which is inserted between said female mold and said at least one male mold are disposed in an autoclave and an external pressure is applied to said mold and to said prepreg laminate whereby said matrix resin is thermally cured.

14. The method according to claim 1, wherein said external pressure applied to said female mold and to said at least one male mold is in the range of 6 to 7 kgf/cm$^2$.

15. The method according to claim 1, wherein said internal pressure to be effected from the expansion of said male mold is in a range of 1 to 2 kgf/cm$^2$.

* * * * *